O. OLSON.
AUTOMOBILE TIRE SAVER.
APPLICATION FILED OCT. 15, 1920.
1,433,295.        Patented Oct. 24, 1922.
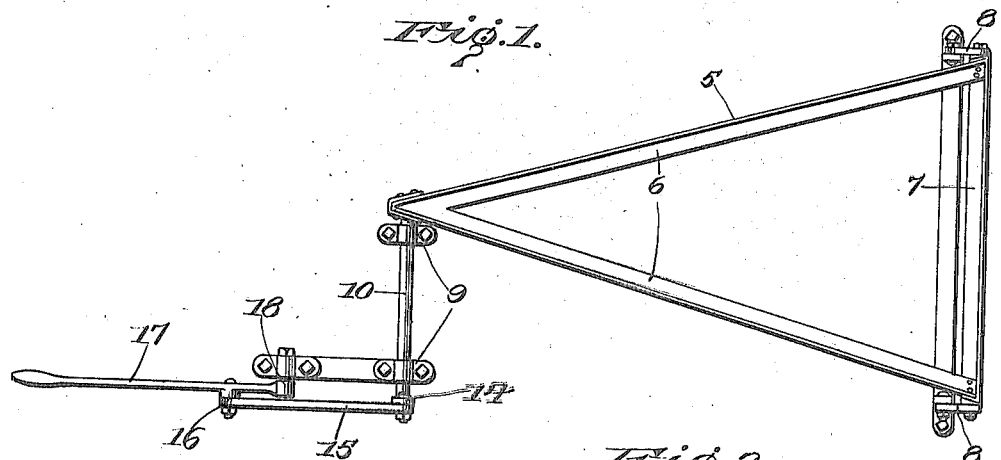
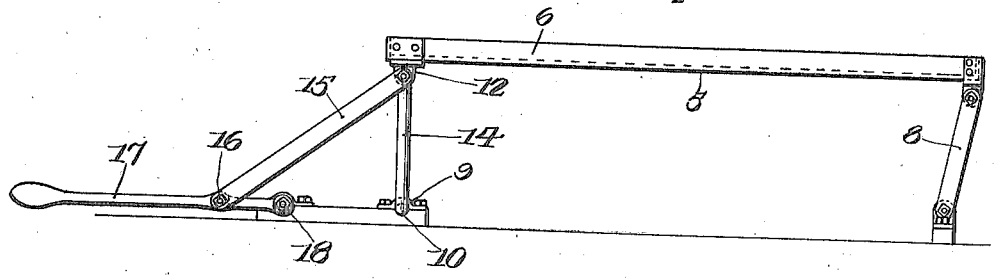
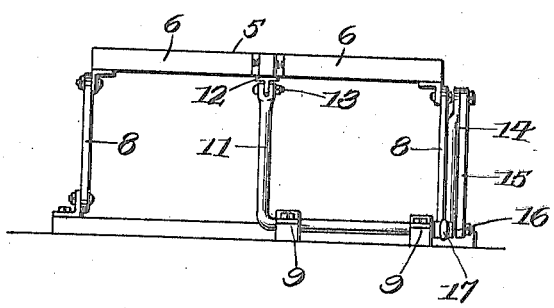
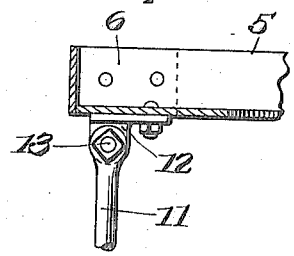
Witness.
James F. Fitz Gibbon
Inventor
Otto Olson.
By Chandler & Chandler
Attorneys Patented Oct. 24, 1922.

1,433,295

UNITED STATES PATENT OFFICE.

OTTO OLSON, OF LITTLE FALLS, MINNESOTA.

AUTOMOBILE TIRE SAVER.

Application filed October 15, 1920. Serial No. 417,180.

*To all whom it may concern:*

Be it known that I, OTTO OLSON, a citizen of the United States, residing at Little Falls, in the county of Morrison, State of Minnesota, have invented certain new and useful Improvements in Automobile Tire Savers; and I do hereby declare the following to be a full, clear, and exact description of the invention, such as will enable others skilled in the art to which it appertains to make and use the same.

This invention relates to vehicle jacks, and is particularly adapted for use in garages or factories for easily and conveniently lifting the vehicle bodily from the floor, so that the weight of the vehicle when it is raised will not be upon the tires.

A further object of the invention is to provide a jack of the character stated which normally lies upon the base or floor in such position as to enable the vehicle to pass readily over the same, and which is constructed and arranged in such a manner as to enable the vehicle to be easily steered and properly centered over the jack.

A further object of the invention is to provide a device of this character which is featured by the lack of complicated mechanism, which has its various parts so constructed and arranged as to minimize the opportunity for wear, breakage, or derangement, which may be easily and quickly operated to either raise or lower the vehicle, and which is equipped with lifting mechanism of such character as to enable heavy vehicles to be easily raised by manual power.

With these objects in view, together with others which will appear as the description proceeds the invention consists in the novel construction, combination and arrangement of parts, all as will be described more fully hereinafter, illustrated in the drawing, and particularly pointed out in the claim.

In the drawing:

Figure 1 is a plan view of the vehicle jack embodying the invention,

Figure 2 is a side elevation showing the jack in raised position,

Figure 3 is a front elevation of the improved jack, and

Figure 4 is a detail view illustrating the manner in which the forward end of the jack is connected with its supporting rock arm.

In carrying out the invention, I employ a lifting frame 5 constructed of bars of wood or metal, and this frame is preferably a trifle longer than the distance between the front and rear axles of the vehicle with which the jack is to be used. The frame may, of course, be of such a length as to accommodate any of the standard types of motor vehicles. This frame is of greater width at one end than at the other, the wider end being disposed in such position upon the supporting base as to engage beneath the rear axle of the vehicle, while the forward end of the frame is to engage beneath the forward axle thereof. In the present instance, the frame is of triangular shape, and by constructing the frame in this manner the chauffeur may easily and conveniently properly center the vehicle above the frame prior to the lifting or elevating operation. By converging the side bars 6 of the jack at their forward ends, it is obvious that ample space will be provided upon each side of the jack for oscillation of the front and steering wheels of the vehicle. The rear end of the bars 6 are connected by a transverse bar 7, and the latter is supported by spaced legs 8. These legs are hinged at their upper ends to the bar 7, preferably near the outer ends thereof, and the lower ends of the legs 8 are hingedly connected with the base or floor.

Suitably mounted in brackets 9 rigidly connected to the base or floor and in advance to the forward end of the frame when the latter is depressed, is a rock shaft 10, this rock shaft is disposed transversely of the longitudinal axis of the frame 5, and is provided at one end with an arm 11. This rock arm is of substantially the same length as the hinged legs 8 at the rear end of the frame, and is received between the clip 12 depending from the forward end of the said frame. The pin 13 establishes pivotal connection between the end of the rock arm and the clip. The opposite end of the rock shaft 10 is provided with an arm 14, preferably disposed in the same plane with arm 11, and to the outer end of the arm 14 is connected the rear end of a link 15. The link 15 is pivotally connected as at 16 with the manually controlled lever 17; the said lever being pivoted at its forward end as at 18 to an extension of one of the bearing members 9 of the rock shaft. It will be observed that the pivot 16 connecting the leg 15 with lever 17 is so disposed with relation to the pivotal support 18 of the lever that when the latter is thrown to the limit of its movement in a forward direction, pivot 16 will pass slightly below the line passing from the point 18 to the pivotal connection of the link 15 with the arm 14.

This construction provides an eccentric lock, whereby the frame is positively maintained in raised position.

In operation the lever 17 is thrown rearwardly until it rests upon the floor or base, whereupon it will be understood, the rock arm 11 will cause the frame 5 to move rearwardly and downwardly flat upon the floor. The vehicle is then moved over the frame, and proper centering of the vehicle over the frame is enabled by reason of the restricted forward end of the frame. When properly positioned over the frame, the lever 17 is grasped and moved forwardly, this operation causing the rock shaft 10 to roll forward raising rock arm 11 and causing the frame 5 to be lifted bodily in a horizontal plane upwardly so as to engage the front and rear axles of the vehicle. Continued upward movement of the lever will cause the vehicle to be lifted so that the wheels thereof will be clear of the floor, and operation of the eccentric lock hereinabove referred to, will maintain the vehicle in raised position until the said lock is broken by manually lifting the lever.

The above describes the invention as used particularly in garages or factories, and in fixed position upon a floor. The hinges of legs 8 and bearings for rock shaft 10 may be bolted or embedded in the base or floor of the garage. It will be understood, however, that should it be desired a mechanism may be mounted upon a movable base, either a skid or roller supported platform in order that the jack may be readily moved from place to place.

What I claim is:—

An automobile jack comprising a horizontal triangular frame, vertical links supporting the wider end of the frame, an L-shaped member supported below the apex of the frame and having the outer end of its vertical leg pivotally connected with said apex, a lever mounted adjacent said L-shaped member, and a link pivotally connected to the lever and to said vertical leg adjacent said apex, said apex end of the frame being arranged to permit steering of the front wheels of an automobile to place the axles thereof directly over the base and apex of the frame.

In testimony whereof, I affix my signature, in the presence of two witnesses.

OTTO OLSON.

Witnesses:
   J. B. BASTIEN,
   N. J. PETERSON.